(12) United States Patent
DeJong et al.

(10) Patent No.: US 7,502,703 B2
(45) Date of Patent: Mar. 10, 2009

(54) CALIBRATION OF THE FUNDAMENTAL AND HARMONIC ONCE-AROUND VELOCITY VARIATIONS OF ENCODED WHEELS

(75) Inventors: Joannes N. M. DeJong, Hopewell Junction, NY (US); Lloyd A. Williams, Mahopac, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/775,015

(22) Filed: Jul. 9, 2007

(65) Prior Publication Data

US 2009/0018791 A1 Jan. 15, 2009

(51) Int. Cl.
*G01P 21/00* (2006.01)
*G06F 19/00* (2006.01)

(52) U.S. Cl. .............................. 702/96; 33/712; 33/732; 33/734; 33/735; 33/744; 33/747; 33/772; 33/773; 33/776; 377/1; 377/19; 377/24; 702/85; 702/97; 702/104; 702/105; 702/142; 702/145; 702/146; 702/158; 702/163

(58) Field of Classification Search .................. 33/700, 33/712, 732, 734, 735, 744, 747, 772, 773, 33/776; 377/1, 19, 24; 702/1, 85, 94, 95, 702/96, 97, 104, 105, 127, 142, 145, 146, 702/155, 158, 163, 189
See application file for complete search history.

(56) References Cited

U.S. PATENT DOCUMENTS

| 3,543,597 | A | * | 12/1970 | Schamphelaere et al. ... 474/103 |
| 3,545,087 | A | * | 12/1970 | Vontsolos et al. .............. 33/732 |
| 5,094,442 | A | | 3/1992 | Kamprath et al. |
| 5,237,521 | A | | 8/1993 | Raj et al. |
| 5,737,216 | A | * | 4/1998 | Hokari ......................... 700/56 |
| 5,737,483 | A | * | 4/1998 | Inaji et al. .................... 388/805 |
| 6,304,825 | B1 | | 10/2001 | Nowak et al. |
| 6,533,268 | B2 | | 3/2003 | Williams et al. |
| 6,575,458 | B2 | | 6/2003 | Williams et al. |
| 6,736,394 | B2 | | 5/2004 | Herrmann et al. |
| 6,941,096 | B2 | * | 9/2005 | Matsuda et al. ............. 399/167 |
| 6,996,357 | B2 | * | 2/2006 | Matsuda et al. ............. 399/167 |
| 7,436,146 | B2 | * | 10/2008 | Shim et al. ................... 318/685 |
| 2005/0249524 | A1 | * | 11/2005 | Matsuda et al. ............. 399/167 |
| 2005/0263958 | A1 | | 12/2005 | Knierim et al. |
| 2006/0176006 | A1 | * | 8/2006 | Shim et al. ................... 318/685 |
| 2007/0025788 | A1 | | 2/2007 | deJong et al. |
| 2007/0085265 | A1 | | 4/2007 | DeJong et al. |
| 2007/0126837 | A1 | * | 6/2007 | Takahashi et al. ........... 347/104 |

* cited by examiner

*Primary Examiner*—Edward R Cosimano
(74) *Attorney, Agent, or Firm*—Oliff & Berridge, PLC

(57) ABSTRACT

A method of calibrating once-around and harmonic errors of encoded nips is provided. An encoder with an index pulse is used to measure the velocity and rotation of the driven wheel or idler. The geometry of the drive train and wheel and idler is chosen so that their once around and harmonic frequencies are unique such that no other drive errors will generate these frequencies. The method includes running the idler or wheel at substantially constant velocity for N revolutions. Each index triggers the collection of velocity data, which is averaged for N revolutions. This process detects drive train motion errors that are periodic with respect to the timing of the index pulse (i.e., once per revolution of the wheel or idler). Once the velocity errors have been measured, corrections are made. This method may be incorporated in xerographic machines as part of a setup or calibration procedure.

25 Claims, 11 Drawing Sheets

CALIBRATION OF THE FUNDAMENTAL AND HARMONIC ONCE-AROUND VELOCITY VARIATIONS OF ENCODED WHEELS

BACKGROUND

This disclosure generally relates to xerographic machines, such as printers and copiers, and specifically relates to media handling, such as feeding, transport and finishing.

Various systems and methods for automatic sheet registration in xerographic machines, including sheet deskewing, are known in the art. One such system and method is described in U.S. Publication No. 2005/0263958 to Knierim et al. for controlling, correcting, or changing the orientation and position of sheets traveling in a sheet transport path. The sheets include those being printed in a reproduction apparatus, which may include sheets being fed for printing, sheets being re-circulated for second side (duplex) printing, and/or sheets being output to a stacker, finisher, or other output or module.

The related art discussed below demonstrates the long-standing efforts in this technological art for more effective sheet registration for xerographic devices, such as printers, copiers, facsimile devices, scanners, and the like. The related art includes translation electronic registration (TELER or ELER) sheet deskewing and/or side registration systems, such as U.S. Pat. No. 6,575,458 to Williams, et al., and U.S. Pat. No. 6,736,394 to Hermann et al. In either ELER or TELER systems, initial or incoming sheet skew and position may be measured with a pair of lead edge sensors, and then two or more ELER or TELER drive rollers may be used to correct the skew and process direction position with an open loop control system in a known manner. The drive rollers have two independently driven, spaced apart, inboard and outboard nips. Some ELER systems use one servomotor for process direction correction and another motor (e.g., a stepper motor) for the differential actuation for skew correction, as variously shown in U.S. Pat. Nos. 6,575,458 and 6,533,268 to Williams et al. Other ELER systems have separate servo or stepper motors independently driving each of the two laterally spaced drive nips for process direction registration and sheet skew registration.

Many sheet transport systems including most TELER and ELER systems use a frictional force drive nip to impart velocity to a sheet. Typically, a nip consists of a motor driven elastomeric surface wheel or "drive roller" and a backup wheel or "idler roller" that is spring loaded against the drive roller to provide sufficient normal force for a normally non-slip drive of the sheet. A well known example of the drive roller surface is a urethane material. In contrast, the idler roller (wheel) is usually a hard substantially inelastic material (metal or hard plastic). The angular velocity of the drive nip has typically been measured with the encoder mounted on either the drive nip, or on the servo or stepper motor driving the drive roll directly or through a transmission as in a timing belt drive.

Many paper registration systems in printers use two drive nips (inboard and outboard nips) as part of the paper path delivering the sheet from an input location to an output location. This output location may be an image transfer position, where an image is transferred to the sheet. In order for the image to be properly positioned on the sheet, the sheet position (in both process direction and skew) needs to be within defined, desired specifications, even though the arrival position of the sheet at the image transfer position may be downstream from the two variable speed drive nips or other paper registration system providing the sheet to image registration.

Typically, the position of the sheet is measured at an input location and a desired sheet trajectory is calculated. From that desired sheet trajectory, the desired nip velocities are calculated. That is, the average of the two nips will determine the process direction position correction and the differential velocity of the two nips will determine the skew registration correction. The compliance of the compliant drive nip causes the sheet velocity to be different from the imposed velocity by the drive nip. The ratio of actual paper velocity to the imposed velocity is known as the drive ratio. This drive ratio error effect will cause that desired paper trajectory to differ from the actual paper trajectory. This can lead to significant output registration errors that are outside of the defined, desired specifications. As a result, the sheet may not be sufficiently accurately aligned or overlaid with one or more print images.

For printing in general, providing sheet skewing rotation and sheet registration while the sheet is being fed forward in the printer sheet path is a technical challenge, especially as the sheet path feeding speed for systems increases. Print sheets are typically flimsy paper or plastic imageable substrates of varying thickness, stiffness, frictions, surface coatings, sizes, masses, and with various humidity conditions. Sheets of some with these various characteristics are particularly susceptible to feeder slippage, wrinkling, or tearing, especially when subject to excessive accelerations, decelerations, drag forces, path bending, and the like.

In addition to sheet lateral registration based on deliberate skew inducement and removal and TELER systems, there are other sheet side-shifting lateral registration systems, in which the entire structure and mass of a carriage continuing the two drive rollers, their opposing nip idlers, and the drive motors (unless splined drive telescopically connected) are axially side-shifted to side-shift the engaged sheet into lateral registration. However, even in such systems, the sheet lateral registration movement can be done during the same time as, and independently of, the sheet deskewing movement. These may also be broadly referred to as TELER systems. For example, see U.S. Pat. No. 5,094,442 to Kamprath et al.

In various sheet registration systems, the use of sheet position sensors, such as a charge-coupled device (CCD) multi-element linear strip array sensor, may be used in a feedback loop for slip compensation to ensure the sheet achieves the desired three-axis registration. Sheet registration systems are operated and controlled by appropriate operation of conventional control systems. It is well known to program and execute imaging, printing, paper handling, and other control functions and logic with software instructions for processors, as taught by numerous prior patents and commercial products. Such software may, of course, vary depending on the particular functions, software type, and processor or other computer devices used, and may alternatively be implemented partially or fully in hardware using standard logic circuits or other designs.

Many sheet transport nips consist of a compliant drive wheel and a non-compliant idler wheel that is spring-loaded against the drive wheel. The compliance of this drive nip is known to cause a forward velocity error, which is an error in the velocity imparted to the sheet from the drive nip to move the sheet forward. U.S. Publication No. 2005/0263958 to Knierim et al. describes the measurement of sheet velocity from encoded non-compliant idler wheels. In general, drive trains include a drive component (e.g., a motor) and a driven component (e.g., a wheel, pulley and gear). In sheet transport systems, the drive component is a drive wheel and the driven component is the compliant nip with a non-compliant idler wheel that is spring-loaded against the compliant nip. Encoders may be mounted to any of the drive, drivers and idler components. Encoder errors and the geometry of the driven component and idler wheel both introduce sheet position placement errors at the once-around and harmonic frequencies. Once-around frequency (also called natural frequency) is the reciprocal of the period of time necessary to complete one cycle of motion. Note, these once around frequencies are not natural frequencies as conventionally used in vibration systems. They are geometric in nature. In sheet transport systems, sheet placement errors may lead to sheet registration errors as well as sheet size measurement errors as described in U.S. Publication Nos. 2007/0025788 and 2005/0263958. Generally, in drive trains, and specifically in sheet transport systems, it is desirable to reduce fundamental and harmonic once-around velocity variations of the driven component.

SUMMARY

Exemplary embodiments include aspects of a system and method for calibrating once-around and harmonic errors of encoded nips. An encoder with an index pulse is used to measure the velocity and rotation of the driven wheel or idler. The geometry of the drive train and wheel and idler is chosen so that their once around and harmonic frequencies are unique, i.e., no other drive errors generate these frequencies. The method includes running the idler or wheel at a substantially constant velocity for N revolutions. Each index triggers the collection of velocity data, which is averaged for N revolutions. This process filters out drive train motion errors that are not synchronous with the timing of the index pulse (i.e., once per revolution of the wheel or idler) leaving only the velocity errors that are periodic with respect to the index pulse. Once the velocity errors have been measured, corrections are made. This method may be incorporated in xerographic machines as part of a setup or calibration procedure or may be done at regular intervals during machine operation.

One aspect is a method for velocity/position calibration in a drive train. A driven component is driven at a substantially constant velocity for a predetermined number of revolutions. The velocity of the driven component is calibrated for one or more synchronous errors. An average velocity may be calculated from the velocity measurements for the driven component during the predetermined number of revolutions. The velocity measurements may be collected and stored. The synchronous errors may be determined from the average velocity and velocity measurements for use in calibrating the velocity of the driven component and may include once-around frequencies and harmonic frequencies.

Another aspect is a device for velocity/position calibration in a drive train including means for driving a driven component and means for calibrating the velocity of the driven component. The means for driving the driven component drives the driven component at a substantially constant velocity for a predetermined number of revolutions. The velocity of the driven component is calibrated for one or more synchronous errors. These errors are determined from velocity measurements for the driven component during the predetermined number of revolutions. The device may include means for calculating an average velocity from the velocity measurements for the driven component during the predetermined number of revolutions. The device may include means for collecting and storing the velocity measurements for the driven component during the predetermined number of revolutions. The device may include means for determining the synchronous errors, which may include once-around frequencies and harmonic frequencies.

Yet another aspect is a device for velocity/position calibration in a drive train including a driven component, a drive component, an encoder, and a calibration component. The drive component has a velocity. The drive component is coupled to the driven component and drives the driven component. The encoder is coupled to the driven component and measures the velocity of the driven component. The calibration component calibrates the velocity of the driven component by reducing select frequencies, which may include once-around and harmonic frequencies. The encoder may provide an index pulse for use in measuring the number of revolutions of the driven component. The geometry of the drive train may be selected so that the select frequencies of the driven component are unique in the drive train; for example the drive component, driven component and encoder may each have a different diameter.

EMBODIMENTS

Exemplary embodiments include a device and method to calibrate the once around and harmonic errors of components in a drive train, such as encoded driven wheels (i.e., nips) and idlers in a registration system for a xerographic machine, (e.g., a printer or copier). The encoders measure velocity of the wheel or idler. The geometry of the driven wheel or idler (e.g., diameter) may be chosen such that their once-around frequency and harmonics are unique for the frequencies of interest. That is, no other elements in the drive train generate these frequencies. In addition, an index on the encoder may provide a once-around reference. The method includes running the idler or wheel at a near constant velocity as imposed by the driver (e.g., motor) in the drive train for N revolutions (i.e., indexes). Each index (i) may trigger the collection of velocity data $v_i(t)$. An average over N observations extracts the once-around component and higher harmonics. A table lookup may be used to correct a velocity measurement for errors, such as once-around and harmonic errors.

Figure 1:
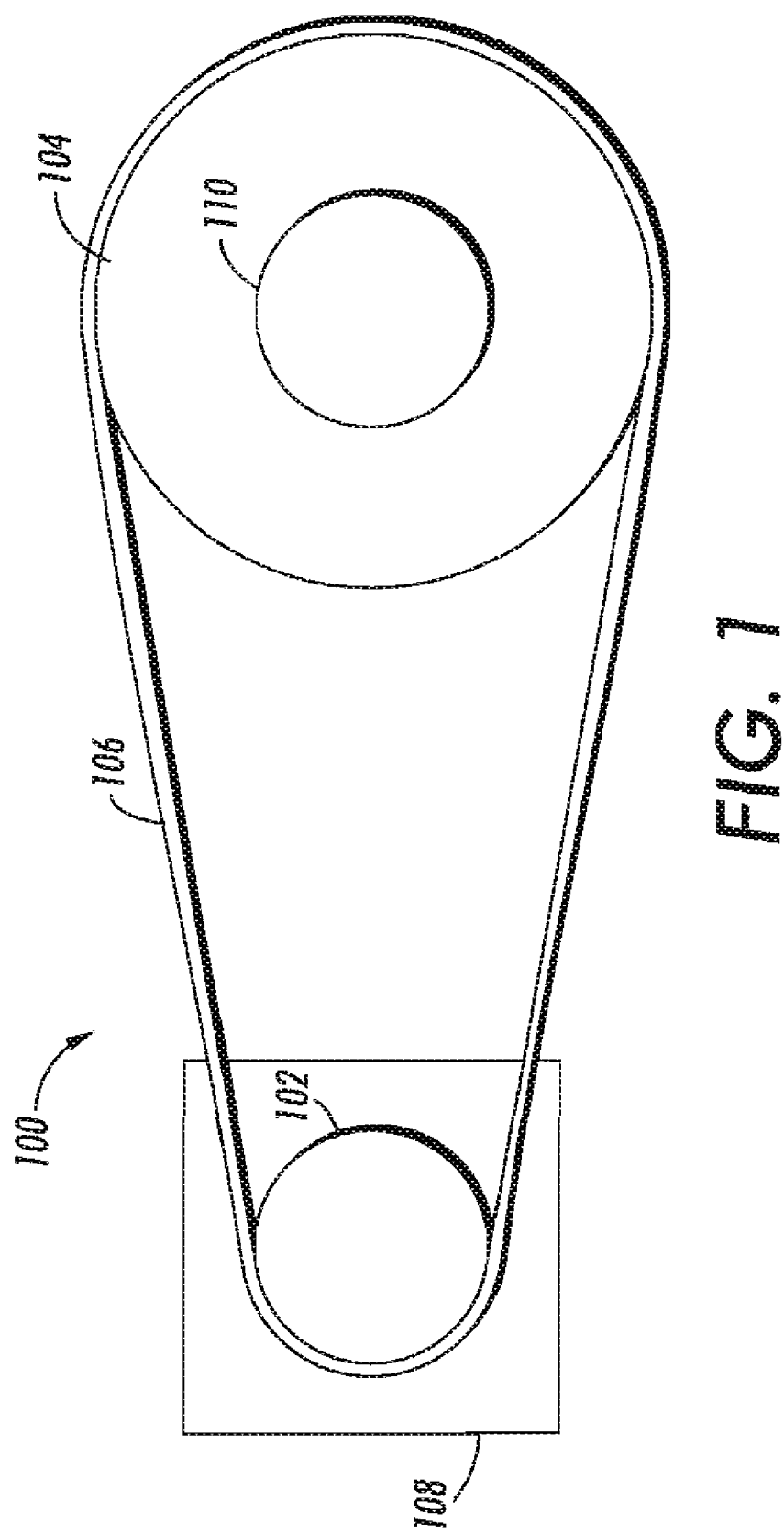
FIG. 1 illustrates an exemplary embodiment of a general purpose drive train.

FIG. 1 illustrates an exemplary embodiment of a general purpose drive train 100. Exemplary embodiments of the calibration device and method are applicable to any kind of drive train without restriction, such as a conveyor belt transporting steel in a steel mill or any other field involving drive trains where accurate velocity/position measurements are important. In this example, the drive train 100 includes a drive component 102 (e.g., a pulley) and a driven component 104 (e.g., a pulley) connected by a transmission component 106 (e.g., a belt). A motor 108, such as a servo motor with an encoder controls the rotational velocity of the drive component 102. In an alternate configuration, a stepper motor may provide the same function. Transmission from the drive component 102 to the driven component 104 may be through a belt, a gear train or another method. The rotational velocity of the driven component 104 is determined by velocity of the drive component 102. An encoder 110 mounted on the driven component 104 measures the rotational velocity of the driven component 104. This measurement has errors due to the geometry of the driven component 104 (e.g., wheel once around and higher harmonics) and encoder errors of the driven component 104 (e.g., encoder once around and higher harmonics).

Figure 2:
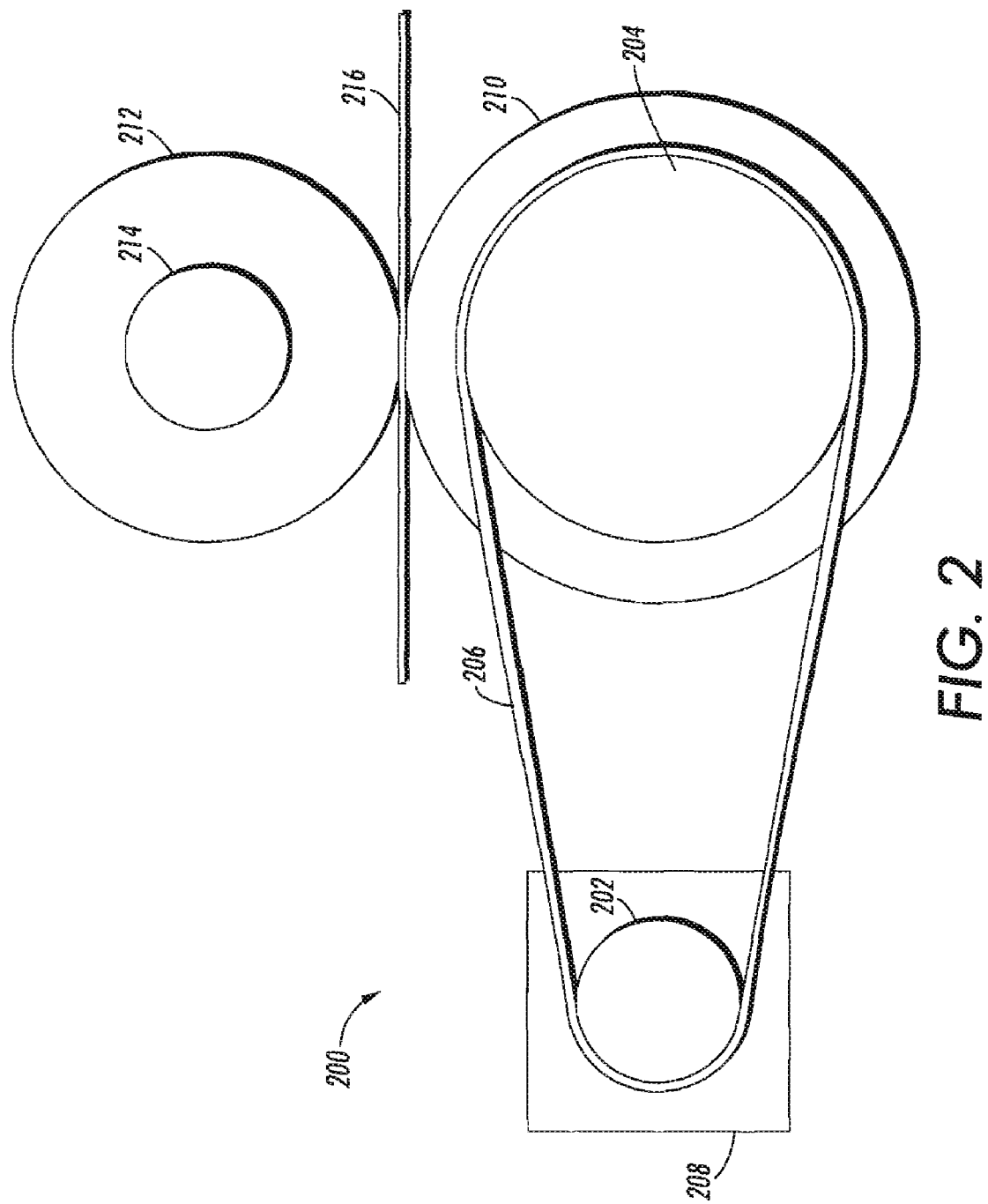
FIG. 2 illustrates an exemplary embodiment of a drive nip in a sheet registration system.

FIG. 2 illustrates an exemplary embodiment of a drive nip 200 in a sheet registration system. This configuration is typical of that in many sheet transport and sheet registration systems. The drive nip 200 includes a drive component 202 (e.g., a pulley) and a driven component 204 (e.g., a pulley) connected by a transmission component 206 (e.g., a belt). A motor with an encoder 208 is coupled to the drive component 202 and a compliant wheel 210 is attached to the driven component 204. A non-compliant idler 212 with an encoder 214 (encoded idler 212) provides a normal force to a sheet 216. A nip is formed between the compliant wheel 210 and the encoded idler 212. The rotational velocity of the nip results in a linear velocity imposed on the sheet 216. The encoder 214 mounted on the encoded idler 212 may measure the surface velocity of the sheet 216 as disclosed in U.S. Publication No. 2005/0263958 or in any other accurate or fairly accurate way. All of the components in the drive nip 200 may contribute in some way to modulation of the sheet velocity. For example, any drive component that is not perfectly centered on a shaft may have a once-around component of the velocity that is imparted to the sheet.

The velocity measured by the encoded idler 212 typically has errors due to the geometry of the encoded idler 212 (e.g., wheel once-around and higher harmonics) and encoder 214 errors (i.e., encoder once-around and higher harmonics). In FIG. 2, the encoded idler 212 measures the surface velocity of the sheet 216. However, such a drive nip 200 may be adapted to measure the surface velocity of photoreceptor belts, intermediate belts among other elements in a sheet registration system in a xerographic machine or other elements in other drive trains. Exemplary embodiments include a calibration method and device to identify once-around and higher harmonic errors and a compensation device and method to correct for such errors.

Figure 3:
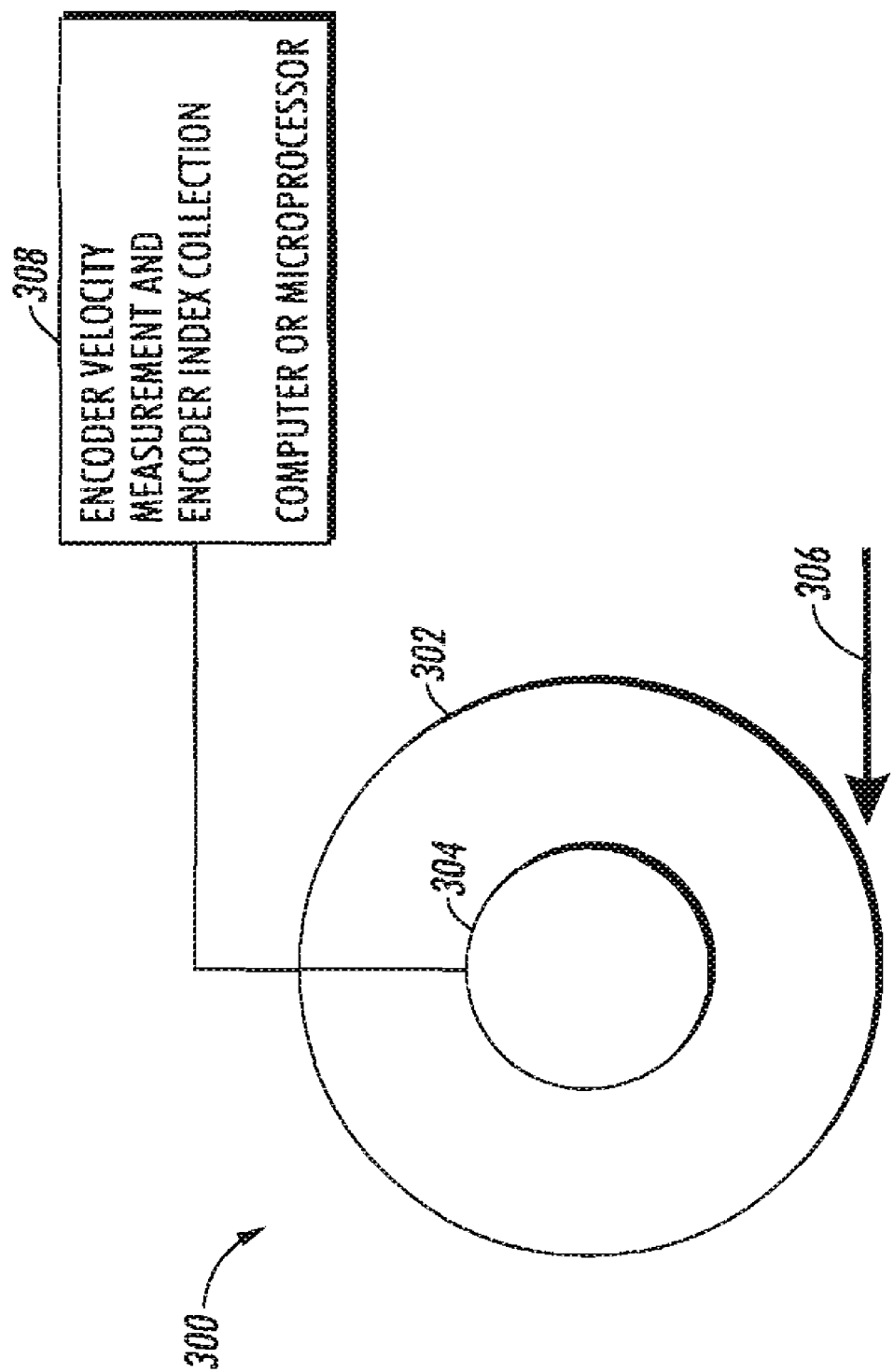
FIG. 3 illustrates an exemplary embodiment of a calibration system.

FIG. 3 illustrates an exemplary embodiment of a calibration system 300. The calibration system 300 is used for collecting velocity measurements and a count of the number of revolutions of a wheel 302 with an encoder 304 and index (not shown). A drive component (not shown) in driving the wheel 302 at a velocity 306. A calibration component 308 receives velocity measurements and the number of revolutions from the encoder 304 by any transmission means 306. The calibration component 308 is any kind of processor or computing device and may also include a storage unit.

FIGS. 1 and 2 may also be considered calibration systems 300, each having a calibration component 308. In FIG. 1, the driven component 104 and its encoder 110 may be considered the calibration component 308, while in FIG. 2, the encoded idler 212 may be considered the calibration component 308. Thus, the calibration method may be applied generally to drive trains and the embodiments of FIGS. 1 and 2 are just examples of drive trains.

The index is an electronic mark indicating once-around, i.e., a revolution. The encoder 304 is mounted on the wheel 302 and may be a digital encoder that provides the index mark as an output signal. As the wheel 302 rotates, a digital pulse train is generated having an index mark once per revolution of the wheel. Alternately, if an index mark is not available from the encoder, the computer or microprocessor may generate a pseudo index pulse through monitoring of the encoder angular position.

In FIG. 3, the calibration component 308 determines a magnitude and a phase of the once-around motion of the wheel 302, allowing compensation for these errors to be made. The once-around frequency and harmonics of the calibration component 308 are unique for the frequencies of interest in the drive train. For instance, frequencies of a motor or a drive component and frequencies introduced by transmission need to be different from frequencies of the calibration component 308. In one embodiment, the ratio of the diameters of all of the components in the drive train are chosen judiciously so that the once-around frequency and harmonics are unique, allowing for measurement of drive train motion errors that are periodic with respect to the timing of the index pulse. The calibration component 308 records an index mark (not shown). The index mark provides a once-around reference mark for the velocity measurement data.

In another embodiment, a microprocessor (not shown) measures the position of the calibration component 308 and calculates the start of each revolution. Conventional rotary encoders mounted to the calibration component provide a pulse for each incremental angular position. Typically, these encoders have N (e.g., 512, 1024, etc.) pulses per revolution. Every time the microprocessor counts N increments, another revolution has started. This serves as an index pulse marker, similar to the index mark described above. The revolution count eliminates the need for an index pulse marker. Recalibration of the revolution count may need to be performed after a shutdown.

In another embodiment, the velocity/position that is imposed on the calibration component does not need to be constant, but must be known. This may be accomplished by a stepper motor drive and counting steps or units of time or a servo motor with encoder feedback position/velocity measurement. This known velocity is used in the calculation in place of the "average velocity."

The average velocity of the wheel 302 may be controlled by a drive train. Examples are a stepper motor driven system, a servo motor with motor encoder feedback, a servo motor with motor encoder or driven component encoder feedback. The wheel 302 may be driven at a substantially constant velocity by the drive train, such as the drive trains of FIGS. 1 and 2. The velocity of the wheel 302 is measured by the encoder 304 and recorded by the calibration component 308. U.S. Pat. No. 5,237,521 to Raj et al. discloses accurate velocity measurements from encoder signals. In one embodiment, position is tracked instead of velocity so that a constant velocity is not required. In one embodiment, calibration measurements are taken for a period of time, such as 50, 100, 150 seconds or more in order to have accurately measured frequencies to analyze for the once-around and harmonic errors.

Figure 4:
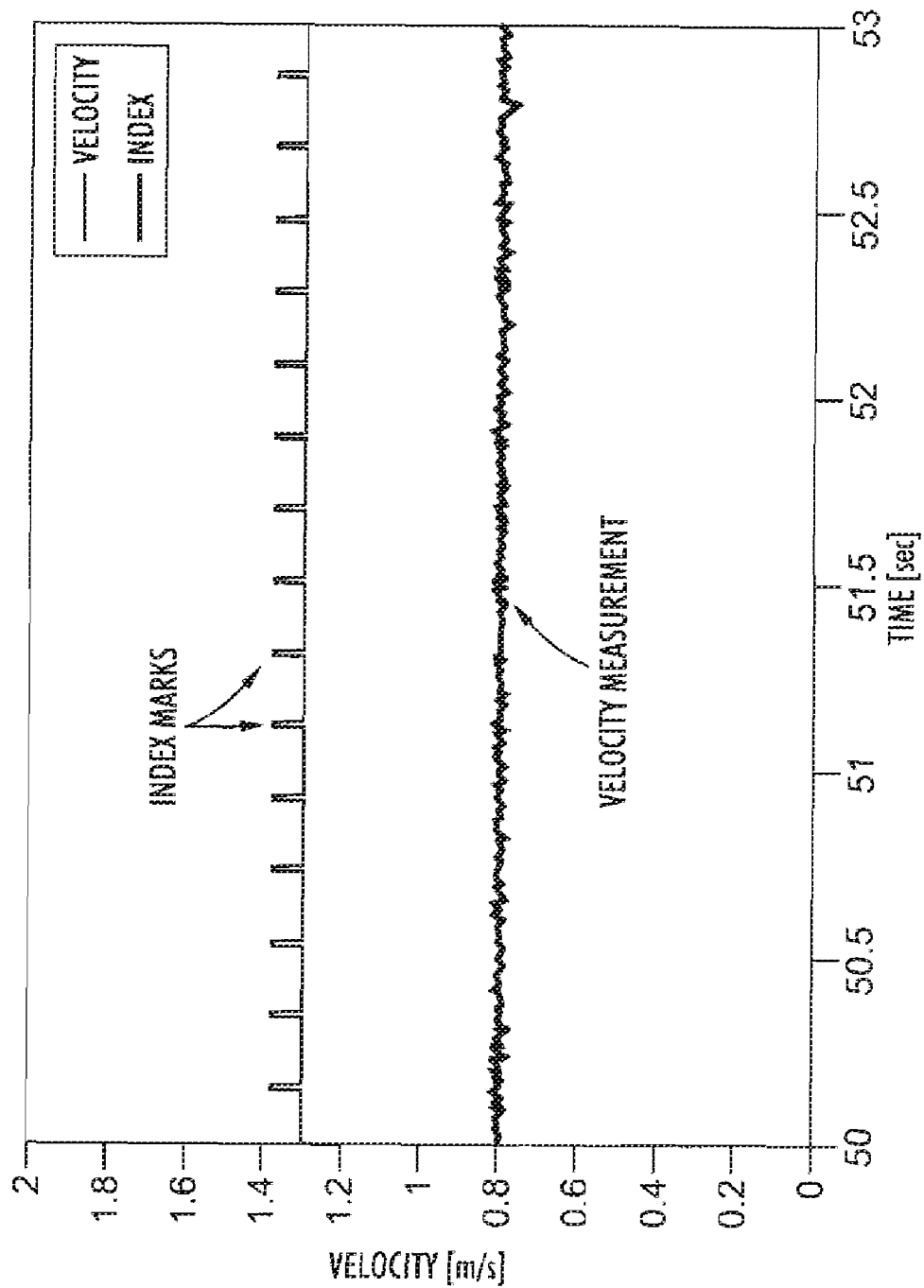
FIG. 4 illustrates a chart of encoder velocity measurement and index marks recorded during an experiment.

FIG. 4 illustrates a chart of encoder velocity measurement and index marks recorded during an experiment. In this experiment, data was collected for about 150 seconds, however FIG. 4 focuses on only one slice of time (i.e., between 50 and 53 seconds) during the 150 second collection period.

FIG. 4 shows a time trace of the velocity signal measured by a calibration component, such as a microprocessor. The particular velocity, 0.8 meters/second, in FIG. 4 is exemplary. In this example, there are about five revolutions per second. Once velocity measurements are collected and analyzed, a calibration signal may be generated to correct for velocity modulation.

Figure 5:
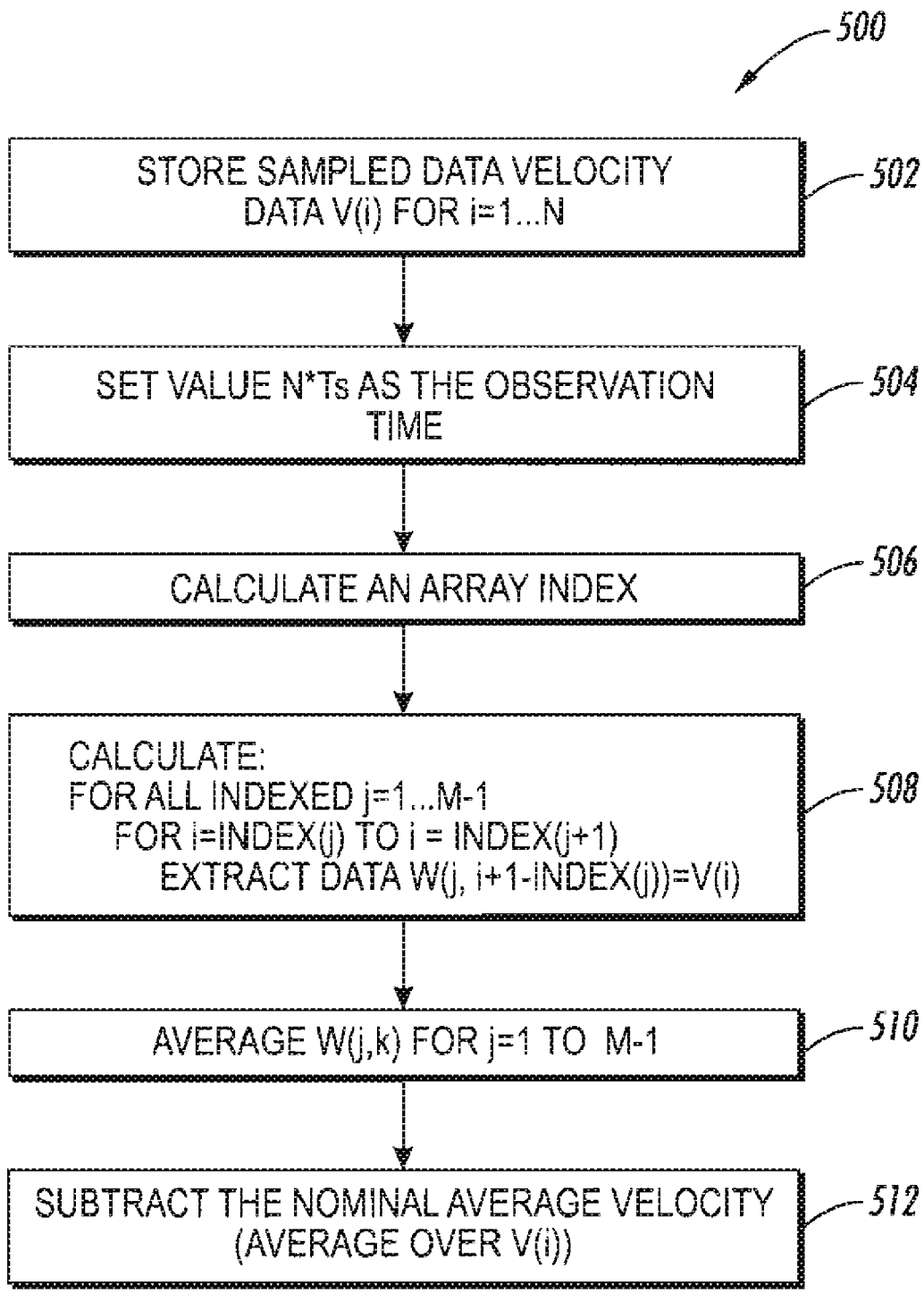
FIG. 5 illustrates an exemplary embodiment of a method of measuring encoder velocity and recording index marks.

FIG. 5 illustrates an exemplary embodiment of a method 500 of measuring velocity and recording index marks. Let a sampled data collection have a sample time Ts. At 502, store sampled data velocity data V(i) for i=1 . . . N in a buffer. At 504, set the value N*Ts as the observation time. At 506, calculate the array index, which contains the values of i at which an index mark occurred. Let the length of the array be M, correspond to M revolutions of the wheel. Then, at 508 calculate:

for all indexes j=1 . . . M−1
for i=Index(j) to i=Index(j+1)
extract data W(j,i+1−Index(j))=V(i).

Figure 6:
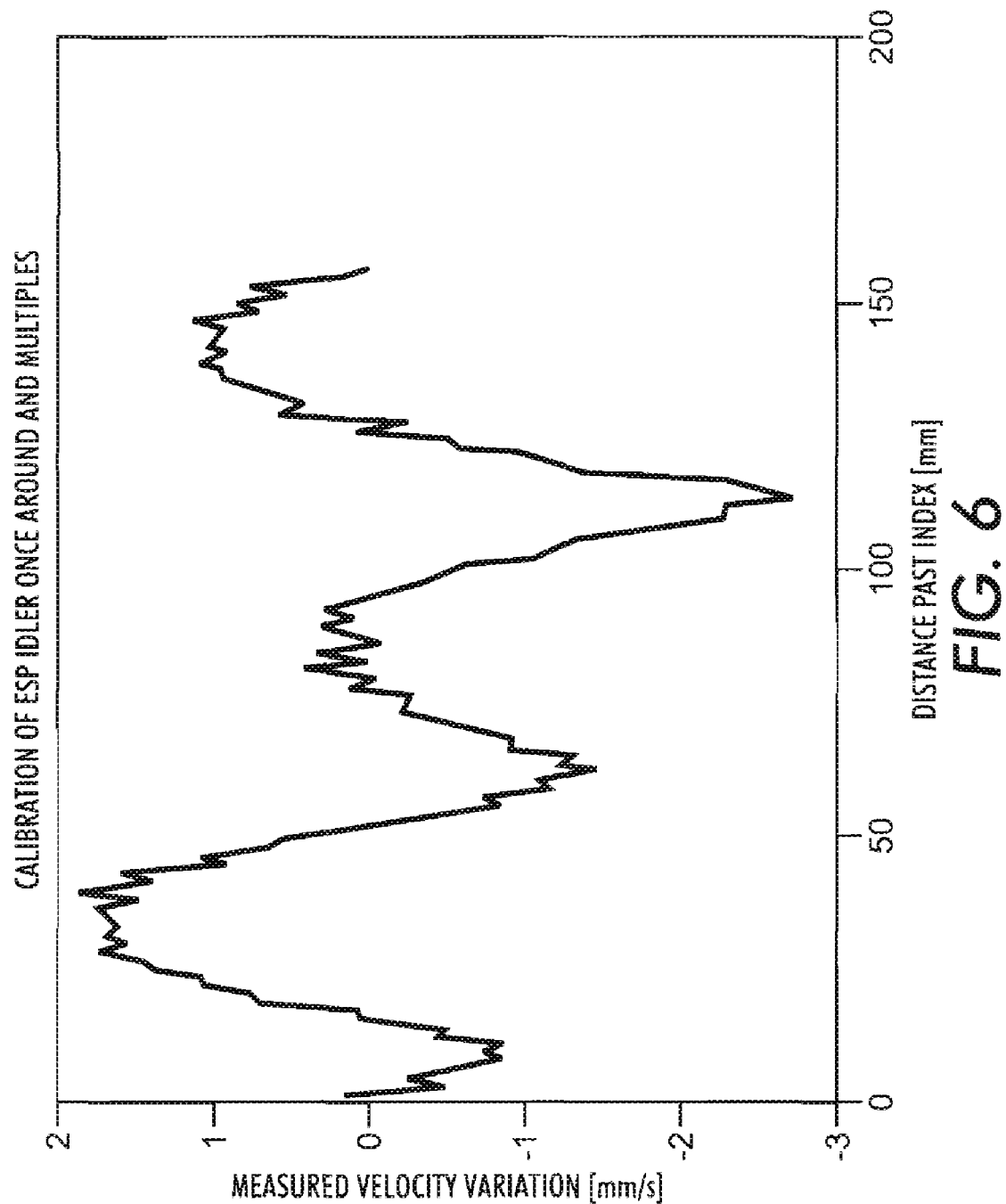
FIG. 6 illustrates experimental data for encoder calibration.

This operation extracts the velocity data for each time slice between indexes. At 510, average W(j,k) for j=1 to M−1 and, at 512, subtract the nominal average velocity (average over V(i)). The result is shown in FIG. 6. Velocity errors could be statistical variations such as random noise that is not periodic. However, the error that is periodic with respect to the index marks will get larger and larger as more measurements are taken, filtering out any frequency components that do not correspond to the once-around or higher harmonics of the calibration component.

FIG. 6 illustrates experimental data for encoder calibration. In FIG. 6, the velocity variation (y-axis) is a function of the distance past the index during one encoder revolution (x-axis). In the experiment, the distance was computed from the wheel diameter and the average velocity. This data may be stored in a table for use in an exemplary embodiment of a velocity correction method and device. The plot in FIG. 6 represents the distance between two index pulses (i.e., one at zero and one at about 155). The average velocity has been subtracted, leaving the variations around the average and the x-scale is calculated as distance past index.

Figure 7:
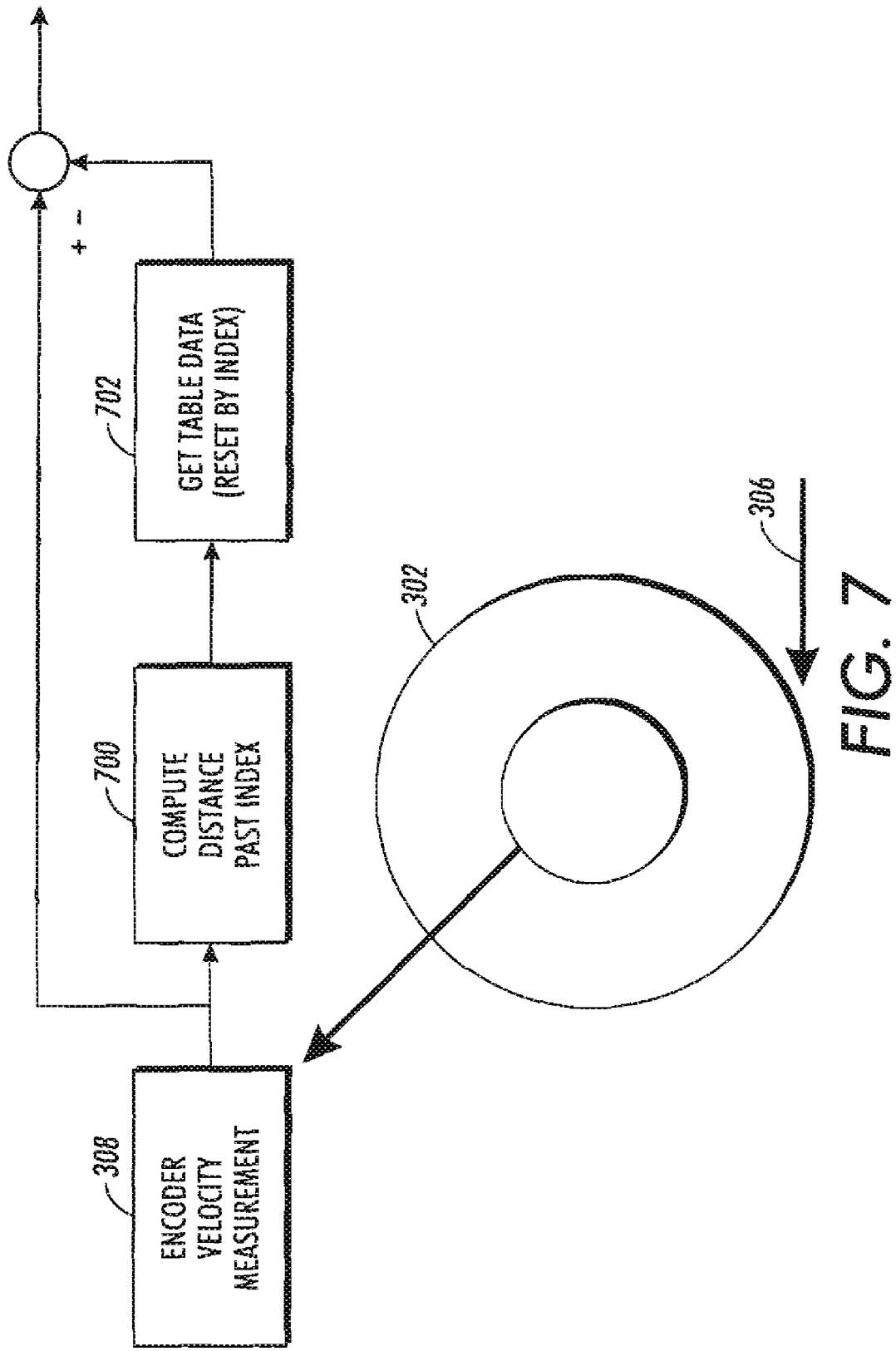
FIG. 7 illustrates an exemplary method and device for correction of once-around and higher harmonics in a velocity measurement.

FIG. 7 illustrates an exemplary method and device for correction of once-around and higher harmonics in a velocity measurement. This exemplary embodiment may be implemented in hardware, software, firmware, or other means. From he encoder velocity measurement 308 and the encoder index (not shown), a distance past the index is computed 700. This may be done by a velocity integrator, which is reset by the index pulse. The approximate y-value (i.e., velocity correction) may be fetched from a table 702 indexed by a measured distance past the index mark. This y-value is subtracted from the velocity measured to obtain a calibrated velocity.

In the exemplary method and device for correction of once-around and higher harmonics of FIG. 7, the wheel 302 rotates at a substantially constant velocity. In an alternate embodiment, the velocity of the wheel 302 is allowed to vary. The method is then extended in two ways. First, the velocity variation is normalized (See FIG. 6) by dividing it by the average velocity used during the calibration procedure. The result is stored in the lookup table. Second, the data from the lookup table is multiplied by the encoder velocity measurement 308.

Figure 8A:
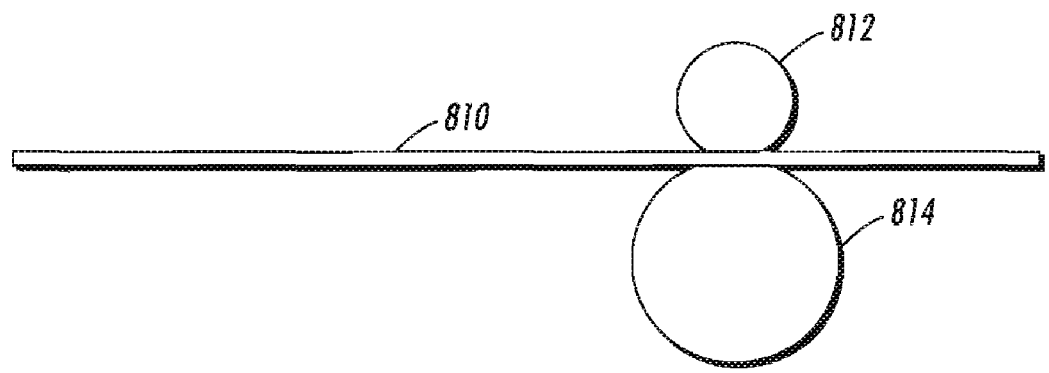
FIGS. 8A and 8B illustrate a schematic and side view of a paper registration device that employs an exemplary embodiment of a calibration method and device.
Figure 8B:
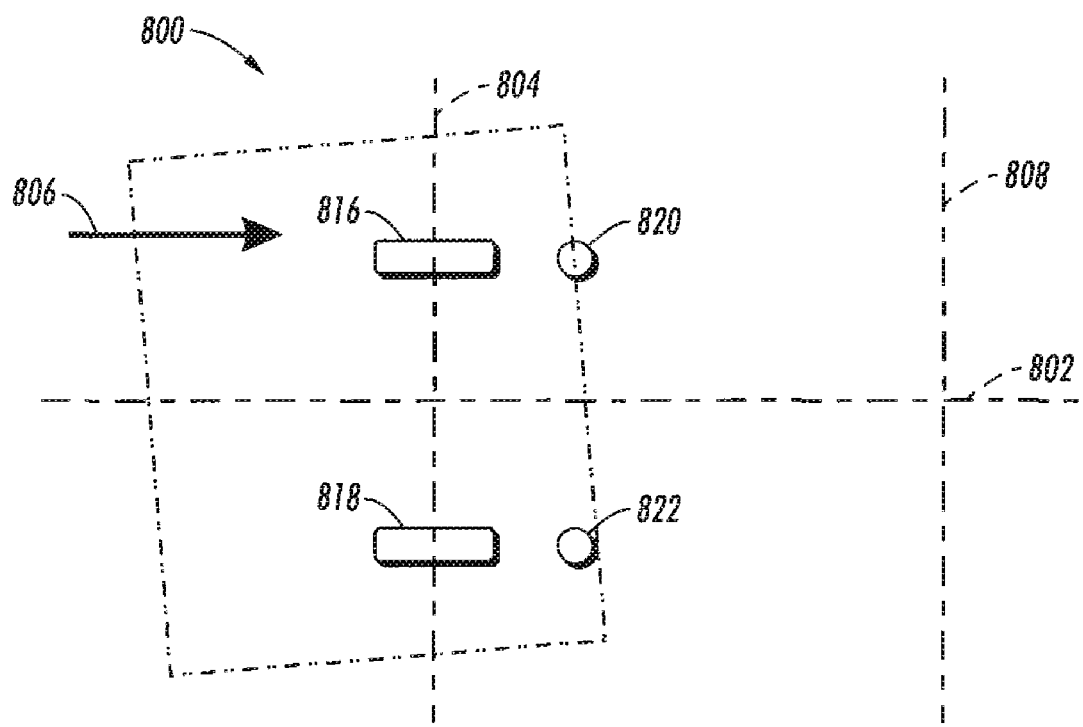

FIGS. 8A and 8B illustrate a schematic and a side view of a paper registration device 800 that employs an exemplary embodiment of a calibration method and device. An x-axis 802 and y-axis 804 are provided in FIG. 8B. A sheet travels with a particular velocity 806 in the paper registration device 800 towards a registration location 808. FIGS. 8A illustrates a side view of the paper registration device 800, where a nip 810 is formed between an encoded idler wheels 812, 814. In FIG. 8B, the inboard 816 (NIPi) and the outboard nips 818 (NIPo) have corresponding inboard 820 (SiI) and outboard sensors 822 (So1).

The sensors 820, 822 are used to determine whether the paper is skewed, as indicated by a difference in the time of arrival of the leading edge of the sheet. The registration device 800 attempts to deliver the sheet to the registration location 808 at a particular point in time to have the sheet to be straight for receiving an image. This may be achieved by deskewing (i.e., imparting a different velocity on each of the nips 816, 818 or increase or decrease both velocities synchronously). The drive nips 816 (NIPi) and 818 (NIPo) execute a registration move to deliver the sheet to the registration location 808 at a predetermined time with a predetermined orientation. The nips 816, 818 have encoded idler wheels 812, 814, which has an index for measuring an inboard velocity (V2i) and an outboard velocity (V2o) of the sheet, which are used to accurately move the sheet.

When exemplary embodiments of a device and method for calibration of once-around and harmonic errors of encoded wheels are applied to a registration system, such as registration device 800, this results in increased accuracy in the velocity measurements of sheets of paper, which, in turn, results in increased accuracy in registration control, i.e., delivering the sheet to the registration location 808 at a desired time with a desired orientation. Such calibration may eliminate some sources of registration errors, such as drive train errors. The drive motor, the transmission and the drive wheel that propels the sheet of paper may have velocity modulations. The velocity modulation of the drive train may be transferred to the motion through the nip, causing registration error. Calibration according to exemplary embodiments reduces the velocity modulation, reducing registration error.

Figure 9:
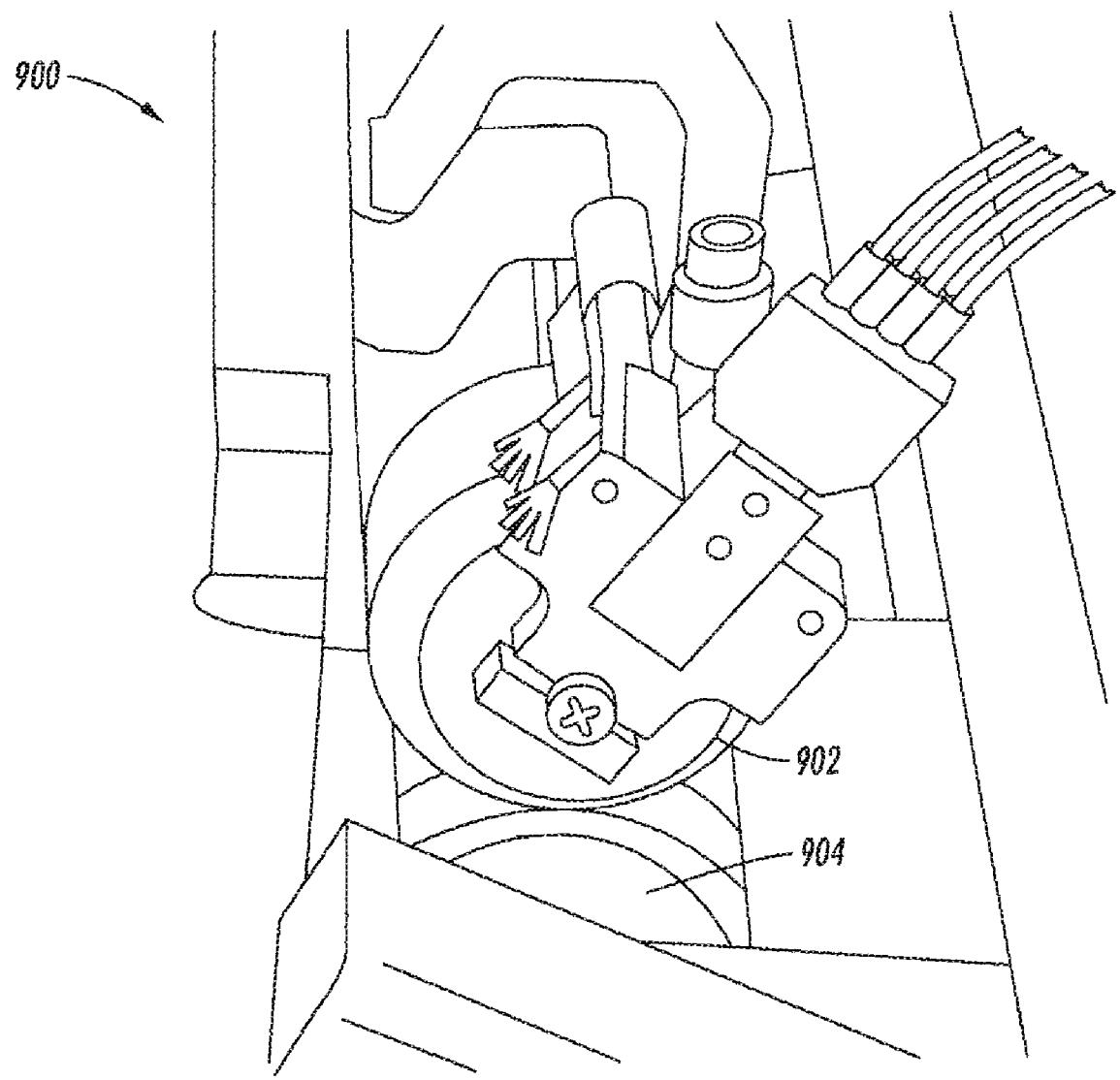
FIG. 9 illustrates a photo of a typical configuration of an encoded idler.

FIG. 9 illustrates a photo of a typical configuration of an encoded idler 900. An encoder disc and index 902 and a drive nip with a rubber layer 904 are shown, but the timing belt drive trains are not shown.

Figure 10:
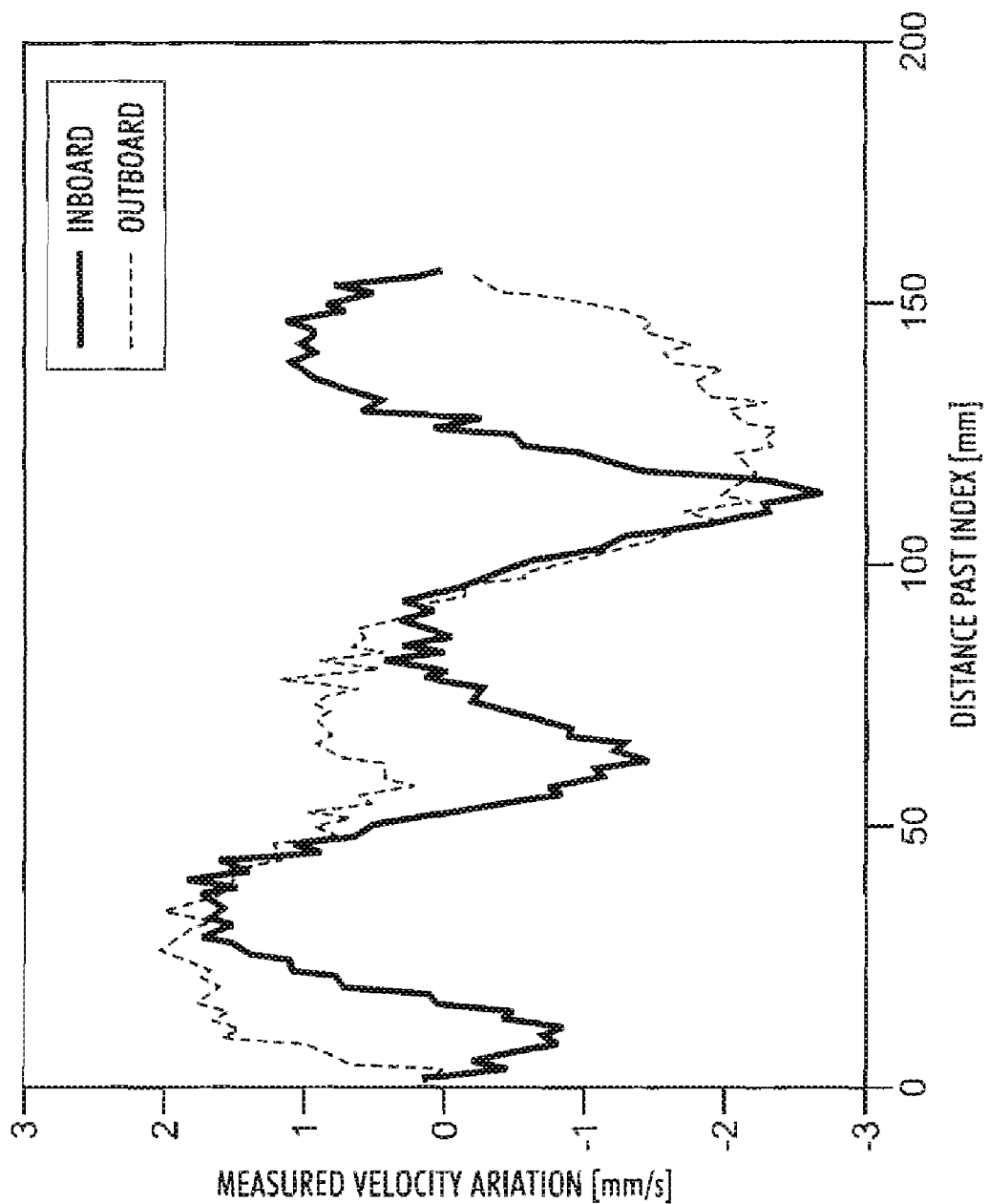
FIG. 10 illustrates experimental results for once-around calibration for inboard and outboard idlers.

FIG. 10 illustrates experimental results for once-around calibration for inboard and outboard idlers. One exemplary embodiment is a method of calibration. During a calibration cycle, no paper was fed to the paper registration device 800 and the inboard 816 and outboard nips 818 were run at a substantially constant velocity for a period of time of 150 seconds. Then, the calibration procedure was applied.

Figure 11A:
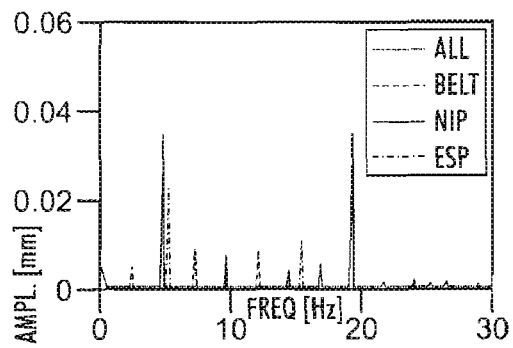
FIGS. 11A-11D illustrate Fast Fourier Transforms (FFTs) of experimental velocity data before and after calibration.
Figure 11B:
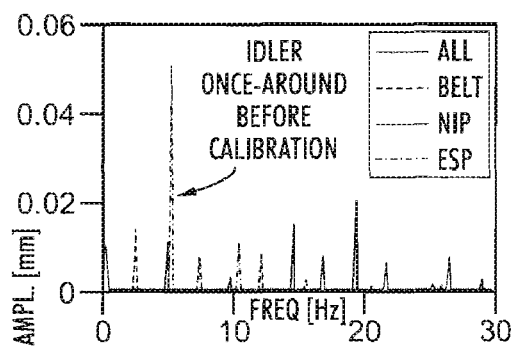
Figure 11C:
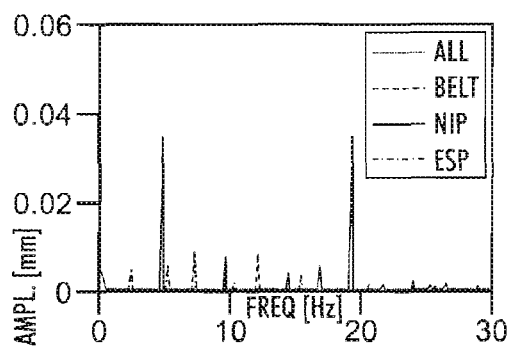
Figure 11D:
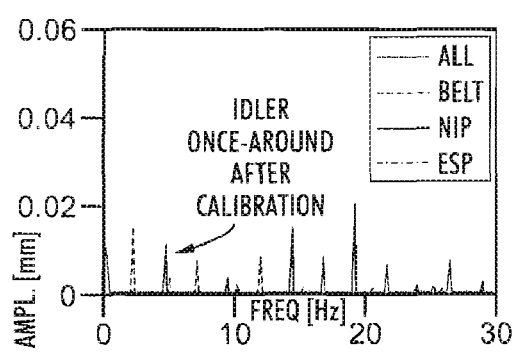

FIGS. 11A-11D illustrate Fast Fourier Transforms (FFTs) of experimental velocity data before (i.e., FIGS. 11A and 11B) and after (i.e., FIGS. 11C and 11D) calibration. The major peaks in the FFTs were from the nip, belt and idler (denoted by "esp" FIGS. 11A-11D), which may be identified by the legends. The gear ratio of the motor to drive nip was four. Hence, the third harmonic of the nip and the once-around of the motor could not be separated. This was of no consequence, because the idler measured all disturbances introduced by the motor, driven nip, belt, and the like. The once-around of the idler and its harmonics, however, introduced measurement error. The idler ("esp") peaks in FIGS. 11C and 11D show the improved peaks after calibration. Frequency and signal analysis in experimental testing revealed that a large contribution to the total error in the velocity measurements was due to once-around velocity variations.

It will be appreciated that various of the above-disclosed and other features and functions, or alternative thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for calibration of errors in a drive train, comprising:
    driving a driven component, the driven component being a wheel forming a nip against another wheel, at a substantially constant velocity for a predetermined number of revolutions;
    calibrating the velocity of the driven component from at least one synchronous error caused by an irregularity of the driven component and determined from a plurality of velocity measurements for the driven component during the predetermined number of revolutions; and
    determining the at least one synchronous error from an average velocity of the velocity measurements used in calibrating the velocity of the driven component.

2. The method of claim 1, further comprising:
    calculating an average velocity from the velocity measurements for the driven component during the predetermined number of revolutions.

3. The method of claim 1, wherein the synchronous error includes once-around frequencies.

4. The method of claim 1, wherein the synchronous error includes harmonic frequencies.

5. The method of claim 1, further comprising:
    collecting the velocity measurements for the driven component during the predetermined number of revolutions.

6. The method of claim 5 further comprising:
    storing the velocity measurements.

7. A device for calibration of errors in a drive train, comprising:
    means for driving a driven component, the driven component being a wheel forming a nip against another wheel, at a substantially constant velocity for a predetermined number of revolutions;
    means for calibrating the velocity of the driven component from at least one synchronous error caused by an irregularity of the driven component and determined from a plurality of velocity measurements for the driven component during the predetermined number of revolutions; and
    means for determining the at least one synchronous error from an average velocity of the velocity measurements used in calibrating the velocity of the driven component.

8. The device of claim 7 further comprising:
    means for calculating an average velocity from the velocity measurements for the driven component during the predetermined number of revolutions.

9. The device of claim 7 wherein the synchronous error includes once-around frequencies.

10. The device of claim 7 wherein the synchronous error includes harmonic frequencies.

11. The device of claim 7 further comprising:
    means for collecting the velocity measurements for the driven component during the predetermined number of revolutions.

12. The device of claim 11, further comprising:
    means for storing the velocity measurements.

13. A device for calibration of errors in a drive train, comprising:
    a driven component having a velocity, the driven component being a wheel forming a nip against another wheel;
    a drive component for driving the driven component;
    an encoder for measuring the velocity of the driven component;
    a calibration component for calibrating the velocity of the driven component from at least one synchronous error caused by an irregularity of the driven component and determined from a plurality of velocity measurements for the driven component during the predetermined number of revolutions, the calibration being by reducing velocity variation occurring at the select frequencies; and
    a processor for determining the at least one synchronous error from an average velocity of the velocity measurements used in calibrating the velocity of the driven component.

14. The device of claim 13 wherein the encoder provides an index pulse for use in measuring a number of revolutions of the driven component.

15. The device of claim 13 wherein the select frequencies include once-around frequencies.

16. The device of claim 13 wherein the select frequencies include harmonic frequencies.

17. The device of claim 13 wherein a geometry of the drive train is selected so that the select frequencies of the driven component are unique in the drive train.

18. The device of claim 17 wherein the drive component, driven component and encoder each have a different diameter.

19. A method for calibration of errors in a drive train, comprising:
    driving a driven component, the driven component being a wheel forming a nip against another wheel, at a known velocity for a predetermined number of revolutions;
    calibrating the velocity of the driven component from at least one synchronous error caused by an irregularity of the driven component and determined from a plurality of position measurements for the driven component during the predetermined number of revolutions; and
    determining the at least one synchronous error from an average velocity based on the position measurements used in calibrating the position of the driven component.

20. The method of claim 19, wherein the synchronous error includes once-around frequencies.

21. The method of claim 19, wherein the synchronous error includes harmonic frequencies.

22. The method of claim 19,. wherein driving the driven component at the known velocity for the predetermined number of revolutions is accomplished by a stepper motor drive and further comprising:
    counting steps or counting time periods.

23. The method of claim 19, wherein driving the driven component at the known velocity for the predetermined number of revolutions is accomplished by a servo motor and further wherein the position is measured by an encoder.

24. The method of claim 19, further comprising:
    collecting the position measurements for the driven component during the predetermined number of revolutions.

25. The method of claim 24, further comprising:
    storing the position measurements.

* * * * *